Jan. 3, 1950      W. A. FREER      2,492,979
CONTROL FOR INTERMITTENT DRIVES
Filed July 3, 1946
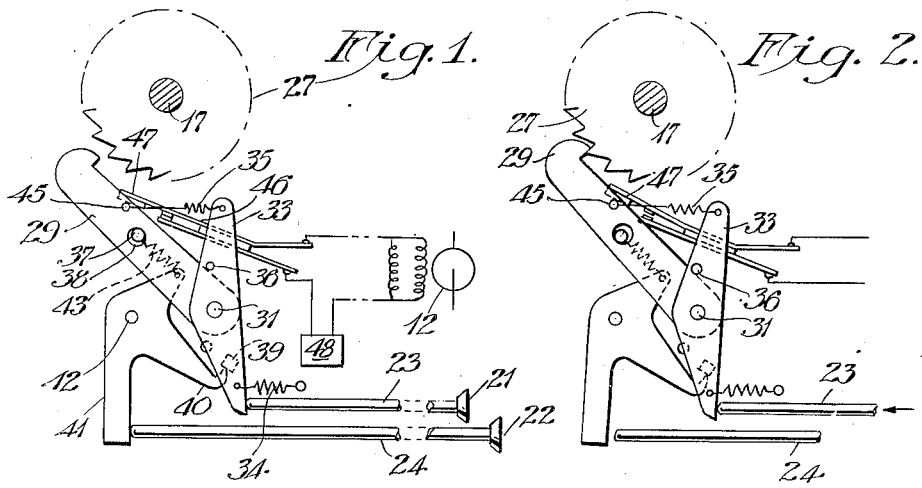
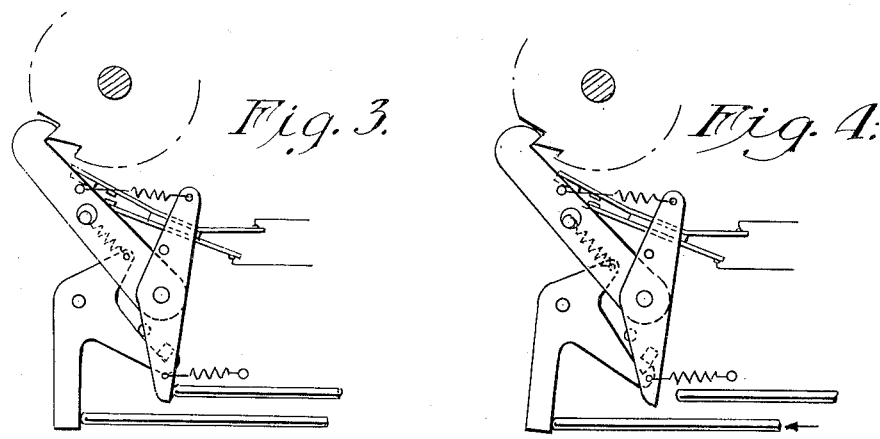
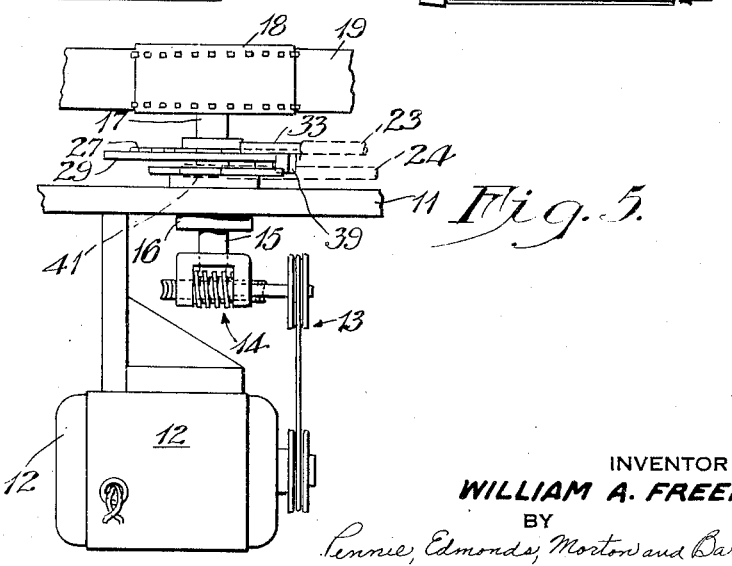
INVENTOR
WILLIAM A. FREER
BY
Pennie, Edmonds, Morton and Barrows
ATTORNEYS Patented Jan. 3, 1950

2,492,979

UNITED STATES PATENT OFFICE 2,492,979

CONTROL FOR INTERMITTENT DRIVES

William A. Freer, Poughkeepsie, N. Y., assignor to American Type Founders, Incorporated, Elizabeth, N. J., a corporation of New Jersey Application July 3, 1946, Serial No. 681,243

8 Claims. (Cl. 192—2)

This invention relates to mechanism for controlling the operation of an intermittently driven member under conditions where quick starting and stopping of the member are required and where only a relatively small amount of power is involved. Among other uses, such mechanism finds application to dictating machines and similar sound recording and reproducing devices where it is desirable that the user of the apparatus have fingertip control of the advancement of the record medium in the making and playing back of a record.

It is, accordingly, an object of the invention to provide means for the sensitive control of a driven member, for example, a film sprocket intermittently driven from a motor in sound recording and reproducing apparatus employing a longitudinally advanced film strip as the record medium.

Another object is to provide sensitive control means whereby a rotatable member may be selectively driven from suitable motive means, momentarily stopped, or stopped for an indefinite period, the control means being subject to only slight displacements to effect such changes of condition.

A further object is to provide mechanism of the above character which coordinates control of the driven member with control of the motive means therefor.

In the form of the invention illustrated herein, a pair of push buttons is provided mounted on the dictating machine or other device in a location convenient to the hand of an operator, one of the push buttons having three positions respectively permitting rotation of the driven member by suitable motive means, momentarily stopping rotation of the driven member while the button is held against a spring bias, and stopping rotation of the driven member indefinitely, the push button being held in this last position by a latch. The other button, when operated, serves to release the latch on the first button, in the last position thereof referred to above, and again permit the driven member to rotate.

Stoppage of rotation of the driven member under control of the first push button is initially brought about by a pawl and ratchet arrangement which holds the driven shaft while slippage occurs at a friction clutch. If a motor drive is employed, operation of the pawl may open the circuit of the motor and quickly bring it to rest after rotation of the driven member has been positively arrested. Alternatively, the pawl and ratchet may serve to control a quick acting positive clutch of the type disclosed in the copending application, Serial No. 681,364, filed July 3, 1946, Edgar L. Steed.

The invention will be better understood from the following detailed description, with reference to the appended drawing in which:

Figs. 1 to 4 are similar plan views, partly in section, of a preferred embodiment of the control means of the invention illustrating different phases of the operation thereof. Fig. 1 includes a diagrammatic circuit of a driving motor.

Fig. 5 is an elevation of the control means of Figs. 1 to 4, in association with a film drive.

In the figures numeral 11 is applied to the frame of the apparatus on which is mounted driving motor 12 connected by speed reducing means comprising belt drive 13 and worm drive 14 to a shaft 15 which operates, through friction clutch 16, a second shaft 17 coaxial therewith mounting the driven member, illustrated as film sprocket 18 engaged with record film 19. For controlling the rotation of sprocket 18 and the advancement of film 19, there is provided a pair of push buttons 21 and 22 conveniently located externally of the apparatus and attached to push rods 23 and 24, respectively, slidable in suitable guides, not shown. The control exercised by buttons 23, 24 is through a pawl and ratchet mechanism comprising ratchet 27 fixedly mounted on shaft 17 and pawl 29 cooperative therewith. Pawl 29 is pivotally mounted on frame 11 of the apparatus at a pivot point 31. A lever 33 cooperating with the pawl is centrally pivoted on the frame, for convenience also at pivot point 31 of the pawl. Spring 34 provides a bias which tends to rotate lever 33 in a counterclockwise direction about its pivot point and, through contact of the lever with rod 23, tends to maintain push button 21 in its non-operated position.

A second spring 35 connects pawl 29 and lever 33 and normally holds the pawl against a stop pin 36 on the lever, so that angular displacement of the lever tends to produce a corresponding displacement of the pawl. The travel of the pawl, however, is limited by a fixed stud 37 positioned within a hole 38 in the pawl, with sufficient clearance between the stud and hole so that in its extreme positions the pawl is respectively in firm engagement with ratchet 27 and clear thereof.

Lever 33 has a square boss or latch pin 39 extending therefrom adapted to be engaged by a hook-shaped arm or latch 40 of three-armed lever 41 pivoted to the frame of the apparatus at 42 and biased toward rotation in a counterclockwise direction about said pivot point by a spring 43, the lever through contact with rod 24 and under the influence of spring 43 tending to hold push button 22 in its non-operated position.

Pawl 29 carries pin 45 adapted to operate a switch 46 by engagement with member 47 thereof. As may be seen from the circuit of Fig. 1 this switch controls the application of power from a source 48 to motor 12 in a manner such that power is normally applied to the motor but is shut off therefrom when pawl 29 is operated to engage ratchet 27.

The four illustrated phases of the operation of the mechanism of the invention will now be considered. In Fig. 1 push buttons 21 and 22 are both shown in a non-operated or retracted position. Button 21 is retracted by spring 34 acting on lever 33, displacement of which is stopped by the engagement of pin 36 with pawl 29 and of pin 37 with the right-hand edge of hole 38, and button 22 is retracted by spring 43 acting on lever 41, displacement of which is stopped by the abutment of the point of hooked arm 40 thereof against boss 39 on lever 33. Switch 46 is closed, pawl 29 disengaged from ratchet 27 and motor 12 drives sprocket 18.

Fig. 2 shows the condition of the mechanism when button 21 has been pushed in part way, momentarily to stop rotation of sprocket 18. Pawl 29 is engaged with ratchet 27 and positively arrests motion of the sprocket and associated members. Displacement of the pawl is limited by the engagement of stud 37 with the left-hand edge of hole 38. Switch 46 is opened to stop the operation of motor 12, any rotation of the motor armature after the pawl and ratchet are engaged being taken up by slippage at clutch 16. Release of button 21 from the position illustrated in this figure will disengage the pawl and ratchet, close switch 46 and cause motor 12 again to operate sprocket 18.

Fig. 3 illustrates the condition when button 21 has been pushed in to the limit of its travel. The positions of the members are substantially those described in connection with Fig. 2 except that the further rotation of lever 33 has extended spring 35, caused pin 36 to leave the pawl and permitted latch arm 40 of lever 41 to latch and hold latch pin or boss 39 of lever 33, under the influence of spring 43. The mechanism will, therefore, remain in the condition shown in this figure after the pressure of the finger has been removed from button 21.

Operation of button 22 to rotate lever 41 from the position of Fig. 3 to that of Fig. 4 unlatches lever 33 by permitting boss 39 to escape from the hook of latch arm 40. Fig. 4 shows the condition when lever 33 is about to return to the position of Fig. 1 under the influence of spring 34, thereby to disengage pawl 29 from ratchet 27, close the circuit of motor 12 and again rotate sprocket 18 from the motor.

While switch 46 has been illustrated and described herein as controlling the circuit of motor 12 alone, it will be apparent that alternatively or in combination with control of the motor it may have other switching functions, to control electrically actuated apparatus of any type synchronously with the starting and stopping of the shaft mounting the driven member.

The embodiment of the invention described herein is to be understood to be by way of illustration and not by way of limitation. The scope of the invention is defined only in the appended claims.

I claim:

1. In mechanism for controlling the operation of a rotatable member intermittently driven from rotative means, a friction clutch operatively connecting said member and means, a ratchet mounted in fixed relation to said member, a pawl pivoted to stationary means adapted to engage said ratchet to stop rotation of said member, a lever pivoted to stationary means about the pivotal axis of said pawl, a stop on said lever, resilient means connecting said pawl and lever and urging said two members toward an angular relationship determined by engagement of said pawl with said stop, a push rod longitudinally operable to engage said lever and jointly displace said pawl and lever about the common pivotal axis thereof to engage the pawl with said ratchet, and a stationary stop for said pawl defining suitable engagement thereof with said ratchet, said lever after engagement of said pawl with said stationary stop being further displaceable to stress said resilient means and thereby hold said pawl firmly against said stationary stop.

2. In mechanism for controlling the operation of a rotatable member intermittently driven from rotative means, a friction clutch operatively connecting said member and means, a ratchet mounted in fixed relation to said member, a pawl pivoted to stationary means adapted to engage said ratchet to stop rotation of said member, a lever pivoted to stationary means about the pivotal axis of said pawl, a stop on said lever, resilient means connecting said pawl and lever and urging said two members toward an angular relationship determined by engagement of said pawl with said stop, a push rod longitudinally operable to engage said lever and jointly displace said pawl and lever about the common pivotal axis thereof to engage the pawl with said ratchet, a stationary stop for said pawl defining suitable engagement thereof with said ratchet, said lever after engagement of said pawl with said stationary stop being further displaceable to stress said resilient means and thereby hold said pawl firmly against said stationary stop, and switch means operated by displacement of said pawl for controlling the energization of said rotative means.

3. In a control mechanism a rotatable shaft, a friction drive therefor, a ratchet affixed to said shaft, a normally disengaged pawl adapted to engage said ratchet to prevent rotation of said shaft, a lever, said pawl and lever being pivoted to stationary means about a common axis, a stop on one of said pivoted members, resilient means urging said pivoted members toward a normal angular position determined by the engagement of the other of said pivoted members with said stop, a push rod adapted to engage said lever and operable to produce joint rotation of the lever and pawl from the normal positions thereof to engage the pawl with said ratchet, said lever being further rotatable against the opposition of said resilient means, other resilient means opposing rotation of said lever by said push rod, latch means operable through said lever to hold said pawl and ratchet engaged, and a second push rod operable to release said latch and allow said lever and pawl to return to said normal positions thereof.

4. In a control mechanism a rotatable shaft, a friction drive therefor including a motor and associated circuit means, a ratchet affixed to said shaft, a normally disengaged pawl adapted to engage said ratchet to prevent rotation of said shaft, a lever, said pawl and lever being pivoted to stationary means about a common axis, a stop on one of said pivoted members, resilient means urging said pivoted members toward a normal angular position determined by the engagement of the other of said pivoted members with said stop, a push rod adapted to engage said lever and operable to produce joint rotation of the lever and pawl from the normal positions thereof to engage the pawl with said ratchet, said lever being further rotatable against the opposition of said resilient means, other resilient means opposing rotation of said lever by said rod, a switch in the circuit of said motor operable by said pawl to stop rotation of the motor when said pawl and ratchet are engaged, latch means operable through said lever to hold said pawl and ratchet engaged, and a second push rod operable to release said latch and allow said lever and pawl to return to said normal positions thereof.

5. In a film drive, rotatable means adapted to engage and longitudinally advance a film strip, a friction drive therefor including a motor and associated circuit means, pawl and ratchet means respectively mounted by stationary means and by said rotatable means adapted upon engagement to hold said rotatable means against displacement, a switch in the circuit of said motor actuated by said pawl to stop the motor when the pawl is engaged with said ratchet, displaceable means resiliently attached to said pawl and controlling the operation thereof, resilient means tending to maintain said displaceable means and said pawl in one position in which the pawl is disengaged from said ratchet, and a latch for said displaceable means, and an actuating member for moving said displaceable means to a second position for holding said pawl engaged with said ratchet with said latch unoperated, said latch being positioned so that further movement of said displaceable means by said actuating member to a third position operates said latch to hold said pawl in engagement with said ratchet.

6. A film drive as claimed in claim 5 which includes movable means for releasing said latch.

7. In a control mechanism, a rotatable shaft and driving means therefor, a ratchet arranged for rotation when said shaft is driven and adapted to arrest rotation of the shaft when the ratchet rotation is arrested, a pawl pivoted to a stationary support and adapted to arrest said ratchet when engaged therewith, a lever pivoted to said stationary support, a stop on one of said pivoted members and resilient means urging said members toward a normal angular position determined by the engagement of the other of said members with the stop, resilient means urging said pawl and lever toward a normal position in which the pawl is disengaged from the ratchet, an actuating member adapted to engage said lever and operable to produce joint rotation of the lever and pawl to engage the pawl with said ratchet, a latch for said lever operable upon further rotation of the lever by said actuating member to thereby hold the pawl in engagement with said ratchet, and an actuating member operable to release said latch and allow the lever and pawl to return to said normal positions thereof.

8. In a control mechanism, a rotatable shaft and driving means therefor, a ratchet arranged for rotation when said shaft is driven and adapted to arrest rotation of the shaft when the ratchet rotation is arrested, a pawl pivoted to a stationary support and adapted to arrest said ratchet when engaged therewith, a lever pivoted to said stationary support, a stop on one of said pivoted members and resilient means urging said members toward a normal angular position determined by the engagement of the other of said members with the stop, resilient means urging said pawl and lever toward a normal position in which the pawl is disengaged from the ratchet, a push rod adapted to engage said lever and operable to produce joint rotation of the lever and pawl from the normal positions thereof to engage the pawl with said ratchet, a latch positioned and adapted to engage said lever upon further rotation of the lever by said push rod to thereby hold the pawl in engagement with said ratchet, and a second push rod operable to release said latch and allow the lever and pawl to return to said normal positions thereof.

WILLIAM A. FREER.

REFERENCES CITED

The following references are of record in the file of this patent:

UNITED STATES PATENTS

| Number | Name | Date |
| --- | --- | --- |
| 2,174,207 | Ford | Sept. 26, 1939 |
| 2,233,798 | Robins | Mar. 4, 1941 |
| 2,406,220 | Hines | Aug. 20, 1946 |

FOREIGN PATENTS

| Number | Country | Date |
| --- | --- | --- |
| 820,729 | France | Nov. 11, 1937 |